United States Patent [19]
Rahman et al.

[11] Patent Number: 5,390,273
[45] Date of Patent: Feb. 14, 1995

[54] FLAME RESISTANT OPTICAL FIBER CABLE WITH OPTICAL FIBERS LOOSELY ENCLOSED IN TUBES

[75] Inventors: Mujibar M. Rahman; Grant M. Davidson; John C. Smith, all of Columbia, S.C.

[73] Assignee: Pirelli Cable Corporation, Lexington, S.C.

[21] Appl. No.: 93,347

[22] Filed: Jul. 16, 1993

Related U.S. Application Data

[63] Continuation-in-part of Ser. No. 862,597, Apr. 2, 1992, Pat. No. 5,229,851.

[51] Int. Cl.6 .................................................. G02B 6/44
[52] U.S. Cl. ...................................... 385/112; 385/113
[58] Field of Search ..................................... 385/100–114

[56] References Cited
U.S. PATENT DOCUMENTS 4,711,523 12/1987 Iri et al. ................................ 385/112
4,859,024 8/1989 Rahman ............................... 385/112
5,140,664 8/1992 Bosisio et al. ...................... 385/112

*Primary Examiner*—Rodney B. Bovernick
*Assistant Examiner*—John Ngo
*Attorney, Agent, or Firm*—Brooks Haidt Haffner & Delahunty

[57] ABSTRACT

An optical fiber cable which is flame resistant and suitable for both indoor and outdoor use, which includes a central strength member, a fluid impervious tube wound around the strength member, a plurality of optical fibers loosely received in the tube, a sheath of plastic material encircling the tube and the central member, a thermal barrier layer intermediate the tube and the sheath and encircling the tube and the central member to protect the elements inwardly of the heat barrier from heat and flame external to the barrier layer and a water blocking material in any otherwise empty spaces within the tube and between the barrier layer and the tube.

26 Claims, 2 Drawing Sheets

FLAME RESISTANT OPTICAL FIBER CABLE WITH OPTICAL FIBERS LOOSELY ENCLOSED IN TUBES

This application is a continuation-in-part of application Ser. No. 07/862,597 filed Apr. 2, 1992 (now U.S. Pat. No. 5,229,851) and entitled "Optical Fiber Cable with Large Numbers of Ribbon Units Containing Optical Fibers and Enclosed in Tubes."

BACKGROUND OF THE INVENTION

This invention relates to optical fiber communication cables adapted to be used indoors or outdoors.

Optical fiber cables are used for transmitting information between various devices including telephone exchanges, computers, etc. The optical fibers are small in diameter, and are relatively fragile. Therefore, they must be protected from mechanical stresses encountered during manufacture, installation and operation such as bending and pulling stresses. One known way of protecting optical fibers is to place them loosely in tubes with the fibers longer than the tubes and to associate with such tube a tensile member, e.g. a stranded metal wire, a high strength plastic or carbon, glass or graphite fibers, which absorbs the tensile stresses. The tubes with the tensile member are enclosed in a sheath or sheaths. See, for example, U.S. Pat. Nos. 4,078,853; 4,153,332; and 4,230,395.

With the optical fiber loosely received in the tubes, there are unfilled spaces within the tubes, and the fibers are usually protected from moisture and other hydrogen compounds. It is known to fill such tubes with a grease-like material which prevents migration of such moisture and compounds in the tubes but which permits relative movement of the fibers within their enclosing tubes. See, for example, U.S. Pat. Nos. 4,230,395; 4,722,589 and 4,725,121.

When the tubes containing the fibers are of circular or other cross-section and are enclosed by a sheath of circular or other cross-section, there are spaces between the tubes, and it is desirable to prevent the ingress of moisture into the latter spaces. It is known to fill such latter spaces with a grease-like material similar to, or the same as, the grease-like material used to fill the tubes, or hydrogen absorbing compound, but which permits relative movement of the tubes. See, for example, U.S. Pat. No. 4,230,395.

Such tubes containing the optical fibers are often wound helically around a central supporting structure which can contain the tensile member. In some cases, they are placed on the central supporting structure in what is called an S and Z shaped configuration, or in other words, they are wound around the central supporting structure in a first direction, or hand, for one or several turns and then, the direction of winding is reversed for one or several turns. Such reversal is continued periodically. See, for example, U.S. Pat. Nos. 4,697,875; 4,722,589 and 4,725,121.

The foregoing description is typical of optical fiber cables used outside of buildings and a typical diameter of optical fiber with a primary coating used in outdoor cables is 250 um. However, optical fiber cables used inside a building have different requirements and different structures. Thus, "indoor" cable have a tight buffer coating, which is necessary to meet the mechanical performance of an indoor cable, have a typical buffer coating diameter of 900 um. Also other coating diameters have been used in the range of 250 to 1200 um. The cable must meet the requirements of the National Electrical Code, e.g. Article 770, with respect to fire or flame resistance and low smoke producing characteristics, whereas outdoor cables are not required to meet such requirements.

Accordingly, problems arise when an outdoor cable must be connected to an indoor cable, i.e. due to the different cable structures causing termination and splicing problems. While some optical fiber cables meet some of the requirements for cables to be used either indoors or outdoors, such cables do not meet all the requirements for both uses. For example, they do not meet the water penetration test used for an outdoor cable and/or light buffered optical fibers do not meet the tensile loading requirements for an outdoor cable. Also, filled outdoor cables do not meet the fire tests applicable to indoor cables.

SUMMARY OF THE INVENTION

The optical fiber cable of the invention meets all the requirements for cables which are used either indoors or outdoors and termination and splicing problems are reduced. Because the cable of the invention uses optical fibers loosely enclosed in tubes, the fibers are free from stress both indoors and outdoors during installation and operation.

In accordance with preferred embodiments of the invention, a plurality of color coded optical fibers are enclosed in a tube of substantially fluid impervious, e.g., water and/or gas-tight, plastic material which is wound in helical or S and Z fashion, hereinafter sometimes identified as an "alternating hand helix", around a central structural member which, may be covered with a thermoset or thermoplastic material or other material. The central element can be metallic or non-metallic, flexible or relatively rigid and comprise a single element or a plurality of elements impregnated with an epoxy resin, a polyester or a similar material. The optical fibers are loosely received in a tube and have a rectilinear length equal to, or greater or less than the axial rectilinear length of the tube. Preferably, there are a plurality of such tubes so-wound around the central structural member.

The so-wound tubes, preferably, have a non-conductive thread or tape, preferably, one or a number of binding threads of plastic or other material, wound in the same or opposite directions therearound to hold them in place. Such assembly is then covered with one or more layers of thermal and flame barrier tapes, e.g. non-combustible such as woven glass tape or other types of tape such as aramid or polyimide tapes.

If desired, a covering, such as helically wound yarns of polymers, glass or other materials, is applied over the tubes to provide strength. The strengthening yarns are water blocked, such as by using a filling compound or water swellable powder by using water swellable yarns or water swellable tapes or by using a combination thereof. Thereafter, a covering of a low flame propagating plastic material, such as polyvinylchloride with an Oxygen index of at least 28 or other known jacketing compounds, such as low smoke, zero halogen or other materials which meet the National Electric Code, is extruded thereover to form a sheath or jacket. Also, all other materials used under the low flame propagating jacket can be low flame propagating materials. If desired, such sheath or jacket may be covered with protective outer layers, such as metal armoring in the form of metal tapes or wires around the covering of plastic material.

In the preferred embodiment, not only any otherwise empty spaces within the tubes but also any otherwise empty spaces within the sheath or jacket are filled with a water blocking or hydrogen absorbing compound of the type set forth in said U.S. Pat. Nos. 4,230,395; 4,697,875; 4,722,589; 4,725,121 or 4,230,395 or in U.S. Pat. No. 4,718,747.

With such construction, a large number of optical fibers can be included in a single composite cable, and since the outdoor cable is the same as the indoor cable, connections can be readily made between the cables at a building entrance.

Also, the optical fibers can be inserted in the tubes with or without a twist, but preferably, the optical fibers have an S and Z twist for the same reasons that the tubes have an S and Z twist and to prevent stress on the fibers when the tubes are applied around the central member.

BRIEF DESCRIPTION OF THE PREFERRED EMBODIMENTS

FIG. 1 is a diagrammatic perspective view of a preferred embodiment of the optical fiber cable of the invention; and FIG. 2 is an enlarged cross-sectional view of the cable shown in FIG. 1.

DETAILED DESCRIPTION OF PREFERRED EMBODIMENTS

The invention will be described in connection with a cable having six tubes around a central structural member, each tube enclosing a plurality of optical fibers, e.g. sixteen fibers. There may, of course, be a greater or lesser number of tubes and/or a greater or lesser number of fibers in a tube. Instead of individual fibers, the tubes may enclose ribbon units of the type described in said application Ser. No. 07/862,597 (now U.S. Pat. No. 5,299,951).

Figure 1:
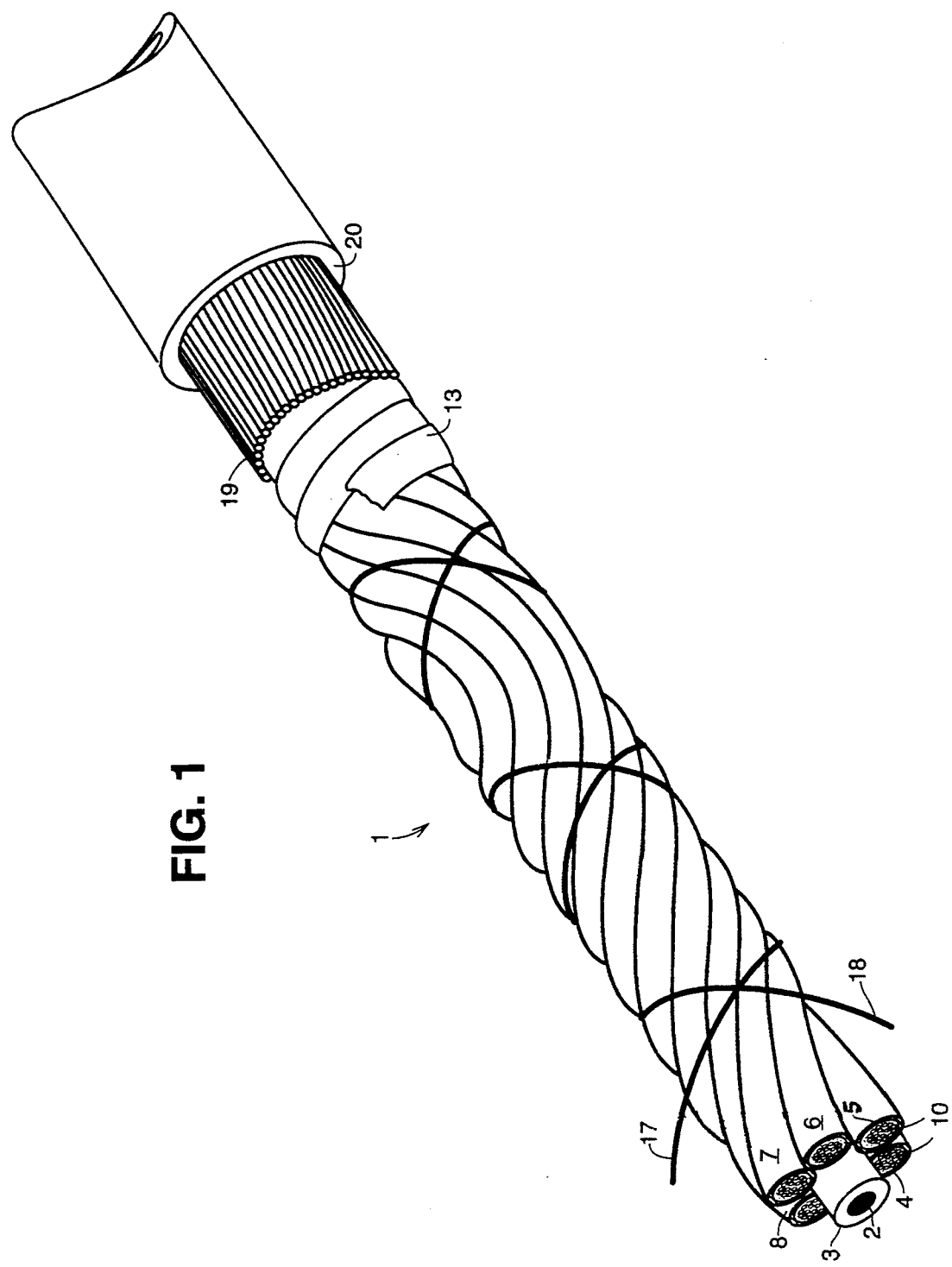
Figure 2:
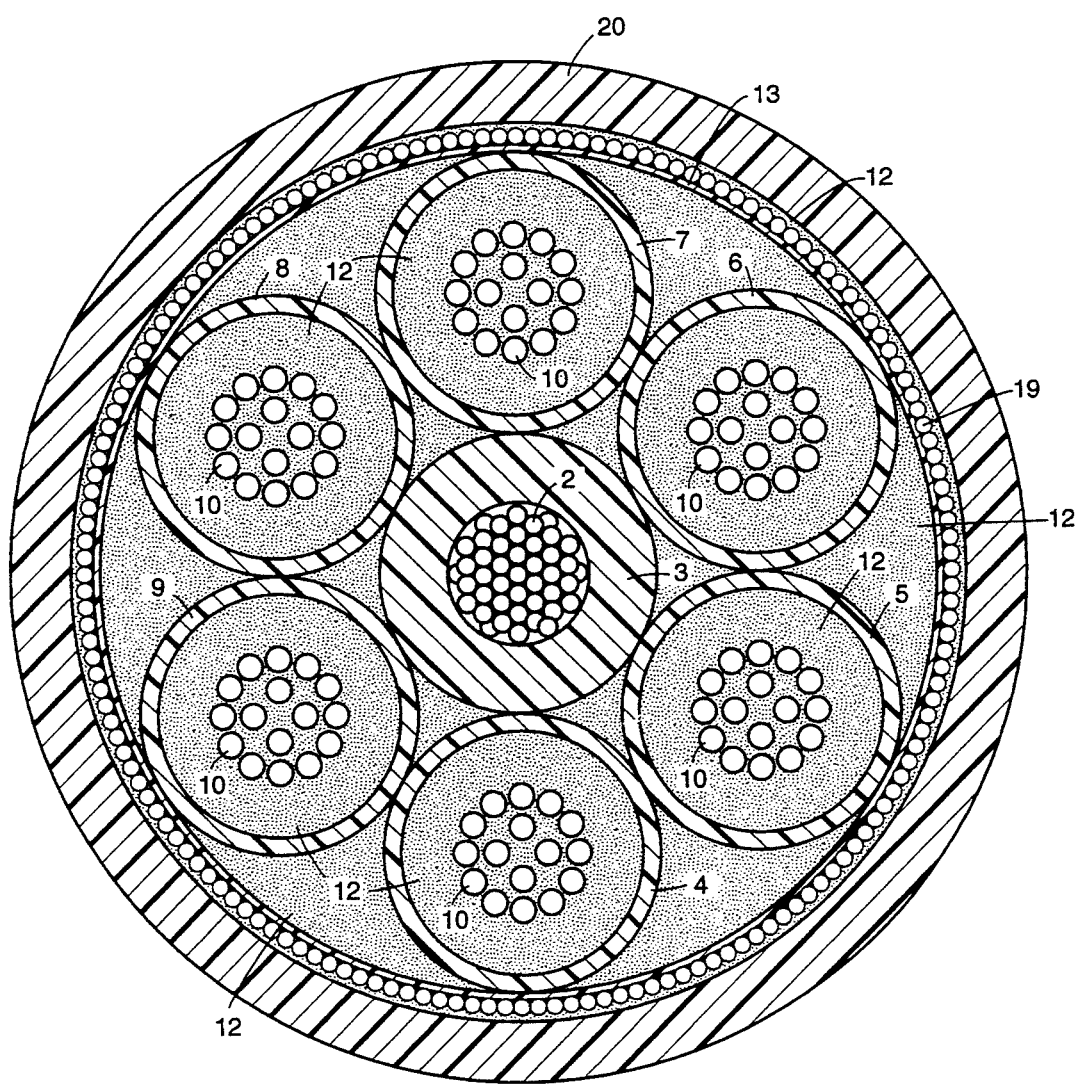

As illustrated in FIGS. 1 and 2, the preferred embodiment of the optical fiber cable 1 of the invention includes a central structural member 2 intended to withstand and resist any tensile or compressive forces applied axially to the cable 1 and to protect other elements of the cable 1 with respect to such forces. As compared to the material of the tubes enclosing the ribbon units, the central structural member is substantially inextensible and incompressible by tensile and compression forces normally applied to the cable 1. The member 2 can, for example, be stranded steel wires or single metallic element, such as a steel wire, or preferably, graphite, glass or polymer fibers, which can be reinforced or bonded or unbonded and which are either parallel to the cable axis or stranded.

The structural member 2, preferably, is encircled by a covering 3 which can be a plastic, either thermoplastic or thermosetting, or another material. If desired, the covering 3 can be a cushioning material, such as a foamed plastic.

If the resistance of the cable 1 with respect to axial tension is provided by means other than the central structural member 2, the central structural member 2 can be omitted while retaining the covering 3 in tubular form, and a plurality of optical fibers or ribbon units can replace the member 2. In the latter case, the optical fibers or ribbon units would be loosely received in the covering 3 and any otherwise empty spaces within the covering 3 would be filled with a moisture blocking compound of the type described hereinbefore.

There are a plurality of tubes 4 through 9 around the covering 3. Each tube 4 through 9 is flexible and substantially fluid impervious and can, for example, be made of a plastic material. The tubes 4 through 9 engage the outer surface of the covering 3 and can contact each other as shown or have a small space therebetween.

Each tube 4 through 9 encircles a plurality of optical fibers 10 which, as shown, are identical, but the fibers 10 may differ from each other, e.g. in the marking, coloring, coating or covering, etc. As is conventional, each fiber 10 has a core and a cladding and can have a protective coating or covering and the diameters of the coated fibers are in the range from 125–1000 um and preferably about 250 um. The cladding diameter is preferably less than 25 um. As shown, each tube 4 through 9 includes the same number of optical fibers 10, i.e. sixteen, but the number of optical fibers 10 in one or more of the tubes 4 through 9 may differ from the number of optical fibers 10 in another of, or the remainder of, the tubes 4 through 9. The fibers may operate as single or multimode fibers.

The internal diameter of the tubes 4 through 9 is such that their cross-sectional areas are greater than the cross-sectional area of the group of fibers 10, e.g. at least 1% to 10% greater than the maximum area of the group, so that the optical fibers can not only slide axially of the tubes 4 through 9 but also move transversely of the axis of the tubes 4 through 9. Thus, the optical fibers 10 are loosely received in the tubes 4 through 9.

Preferably, the optical fibers 10 are not bound together in a group and the optical fibers 10 in a group are not bonded to each other so that they can move relative to each other. Although the group of optical fibers 10 can be helically twisted around the axis of the group or be without a twist, preferably, the group is twisted first in one direction for one or more turns and then, in the opposite direction for one or more turns to aid in reducing or eliminating stress on the optical fibers 10 when the tubes 4 through 9 are applied as described hereinafter.

The optical fibers 10 have a rectilinear length equal, greater, or less than the rectilinear length of the axis of the tubes 4 through 9 in which they are received so that stress applied to the tubes 4 through 9 is not applied to the optical fibers 10 if the tubes 4 through 9 are not stretched beyond normal limits.

Any otherwise empty spaces within the tubes are filled with a water blocking, and/or a hydrogen absorbing, compound 12 of the type described hereinbefore. The compound 12 can be in the form of a known type of grease and can be thixotropic so that movement of the optical fibers 10 with respect to each other and to the tubes 4 through 9 is permitted. Known types of water blocking compound include a silicone based thixotropic compound, a compound based on hydrocarbon oils or polymeric liquids, such as polybutylene, and petroleum greases.

Preferably, the tubes 4 through 9 are wound around the covering 3, and hence, the central member 2, in S and Z, or alternate hand helix, as illustrated in FIG. 1. Thus, the tubes 4 through 9 are helically wound in a first direction, or hand, around the covering 3 for one or several turns and then, are helically wound in the opposite direction, or hand, around the covering 3 for one or several turns, such alternate direction of winding being continued periodically or aperiodically.

In contrast to the situation when the tubes 4 through 9 are wound around the covering 3 in a continuous helix of a single hand, the tubes 4 through 9 will tend to loosen or become disengaged from the cover 3 when an alternate hand helix is used. Therefore, to assist in further processing, the tubes 4 through 9 are held against the covering 3 by a non-conductive tape or thread. As illustrated in FIG. 1, the tubes 4 through 9 are held in place by a pair of helically and oppositely wound threads or yarns 17 and 18. Although only one yarn 17 or 18, or one group of yarns 17 or 18 can be used, two oppositely wound yarns or group of yarns are preferred. Such yarns 17 and 18 may be made of polymers or glass or other materials.

The tubes 4–9 are helically wrapped with a thermal barrier tape layer 13, the purpose of which is to protect the elements within the layer of tape 13, e.g. the tubes 4–9, the optical fibers 10, etc., from heat and flame external to the layer 13. Of course, the layer 13 can be formed other than by tape. The layer 13 is made of a non-combustible material, such as woven glass tape, aramid tape or polyimide tape.

Any otherwise empty spaces between the layer 13 and the tubes 4–9 are also filled with a water blocking compound of the type described hereinbefore.

If the central member 2 is not a strength member, or preferably, even if there is a strength member 2 and further strenthening is needed, the cable 1 can include a layer 19 of a plurality of strings or yarns, such as polymer or glass strings or yarns or of other materials which can be reinforced, bonded or unbonded, and which are applied either between the layer 13 and the tubes 4–9 and yarns 17 and 18 or over the layer 13. In FIG. 1, the yarns 19 are helically wound around the layer 13 to provide a strength member which aids in protecting the tubes 4 through 9 and the optical fibers 11 from tensile forces applied axially of the cable 1.

The strength member layer 19 is encircled by a sheath 20 of a plastic or elastic material. For the purpose of showing the water blocking compound 12, the sheath or jacket 20 is shown spaced from the layer 19 in FIG. 2, but the sheath 20 contacts the layer 19 as shown in FIG. 1. The material of the sheath 20 and its radial thickness are such that the material and thickness will meet the National Electric Code requirements for flame resistance (UL-1666). One such material is polyvinylchloride which has an Oxygen Index greater than 28. Under such Code, e.g. under UL-1666, the spread of fire, or flame propagation, is to be limited to 3.66 meters or less. Also, for some types of installations, the cable may be low smoke producing. Other local codes may have different requirements. Where desired or required for specific installations, the jacket 20 should be made of a low smoke, zero halogen plastic, thermoplastic or thermoset, which will meet the flame propagation test of the National Electrical Code. Other low halogen level, reduced corrosivity and reduced toxicity compounds, considered acceptable in the industry, may also be used.

Any otherwise empty spaces between the jacket 20 and the thermal barrier layer 13 are also water blocked such as by filling them with the water blocking compound described hereinbefore or water swellable powder or a combination thereof. In addition, or alternatively, the yarns of the layer 19 can be water swellable and/or there can be a layer of water swellable tape between the layer 19 and the layer 13 and/or between the layer 19 and the jacket 20.

If desired, the sheath 20 can be encircled by other layers, such as outer layers of metal armoring in the form of metal tapes or wires.

If the central member 2 is stranded, or otherwise formed to leave spaces within the covering 3, such spaces can be filled with a water blocking and/or hydrogen absorbing compound.

Although preferred embodiments of the present invention have been described and illustrated, it will be apparent to those skilled in the art that various modifications may be made without departing from the principles of the invention.

We claim:

1. An optical fiber cable comprising:
   a central member;
   at least one substantially fluid impervious tube wound around said central member;
   a plurality of optical fibers loosely received in said tube;
   a sheath of plastic material encircling said tube which is around said central member, said plastic material having a predetermined flame propagating value which prevents flame propagation upon combustion of the sheath, greater than a predetermined value;
   a thermal barrier layer encircling said tube and said central member and intermediate said tube and said sheath, said thermal barrier layer being electrically non-conductive and being non-combustible when subjected to the flame and the heat of combustion of said sheath;
   a water blocking material in any otherwise empty spaces in said tube and between said thermal barrier layer and said tube, said water blocking material permitting said optical fibers to move with respect to said tube and permitting said tube to move with respect to said thermal barrier layer and to said central structural member.

2. An optical fiber cable as set forth in claim 1 wherein said central member is a central structural member which is substantially inextensible and incompressible as compared to said tube for resisting tensile and compressive forces applied axially of said cable and wherein said cable comprises a plurality of the substantially fluid impervious tubes in side-by-side relation and wound around said central structural member in an alternating hand helix and a plurality of said optical fibers in each of said plurality of tubes.

3. An optical fiber cable as set forth in claim 2 wherein said tubes are made of a plastic material and said water blocking material is a grease and contains a hydrogen absorbing compound.

4. An optical fiber cable as set forth in claim 3 wherein said grease is thixotropic.

5. An optical fiber cable as set forth in claim 2 in which said water blocking material is a silicone based thixotropic compound.

6. An optical fiber cable as set forth in claim 2 wherein said water blocking material is hydrocarbon based.

7. An optical fiber cable as set forth in claim 6 wherein said water blocking material is a polybutene compound.

8. An optical fiber cable as set forth in claim 2 wherein said central structural member is non-metallic.

9. An optical fiber cable as set forth in claim 8 wherein said central structural member comprises yarns selected from the group consisting of glass yarns, aramid yarns and combinations thereof.

10. An optical fiber cable as set forth in claim 2 wherein said central structural member is a metal member.

11. An optical fiber cable as set forth in claim 2 further comprising at least one elongate element of non-conductive material wound around said plurality of tubes for holding said tubes against said structural member.

12. An optical fiber cable as set forth in claim 11 wherein said elongate element is a thread.

13. An optical fiber cable as set forth in claim 11 wherein there are two elongate elements, one of said elements being helically wound around said tubes in one hand and the other of said elements being helically wound around said tubes in an opposite hand.

14. An optical fiber cable as set forth in claim 2 further comprising a strength layer encircling said tubes and intermediate said tubes and said sheath, said strength layer comprising fibers.

15. An optical fiber cable as set forth in claim 14 wherein said fibers are selected from the group consisting of polymer fibers, glass fibers, polymer yarns, glass yarns and combinations thereof.

16. An optical fiber cable as set forth in claim 15 wherein said fibers are bonded together.

17. An optical fiber cable as set forth in claim 15 wherein said fibers are unbonded.

18. An optical fiber cable as set forth in claim 14 wherein said strength layer is intermediate said thermal barrier layer and said sheath and wherein said fibers are selected from the group consisting of glass yarns and aramid yarns.

19. An optical fiber cable as set forth in claim 18 wherein any otherwise empty space between said thermal barrier layer and said sheath are filled with a water blocking material.

20. An optical fiber cable as set forth in claim 1 wherein said thermal barrier layer comprises tape of a non-combustible material selected from the group consisting of glass, aramid, polyimide and combinations thereof.

21. An optical fiber cable as set forth in claim 1 wherein said plastic material of said sheath has a flame propagation value less than about 3.66 meters.

22. An optical fiber cable as set forth in claim 21 wherein said plastic material of said sheath is polyvinyl chloride with an Oxygen Index at least equal to 28.

23. An optical fiber cable as set forth in claim 21 wherein said plastic material of said sheath is substantially free of halogens.

24. An optical fiber cable as set forth in claim 23 wherein said plastic material of said sheath is relatively non-corrosive and produces a low level of toxic emissions upon combustion of said plastic material.

25. An optical fiber cable as set forth in claim 1 wherein any otherwise empty spaces within said sheath are filled with a water blocking material.

26. An optical fiber cable as set forth in claim 1 wherein said optical fibers have a cross-sectional diameter of about 125–1000 um.

* * * * *